US012656952B2

(12) United States Patent
Lim et al.

(10) Patent No.: US 12,656,952 B2
(45) Date of Patent: Jun. 16, 2026

(54) MEMORY MANAGEMENT METHOD AND ELECTRONIC DEVICE USING THE SAME

(71) Applicant: SAMSUNG ELECTRONICS CO., LTD., Suwon-si (KR)

(72) Inventors: Geunsik Lim, Suwon-si (KR); Myungjoo Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 18/088,087

(22) Filed: Dec. 23, 2022

(65) Prior Publication Data

US 2023/0214122 A1 Jul. 6, 2023

Related U.S. Application Data

(63) Continuation of application No. PCT/KR2022/020344, filed on Dec. 14, 2022.

(30) Foreign Application Priority Data

Dec. 23, 2021 (KR) ........................ 10-2021-0186591
Jun. 21, 2022 (KR) ........................ 10-2022-0075779

(51) Int. Cl.
G06F 3/06 (2006.01)

(52) U.S. Cl.
CPC .......... G06F 3/0611 (2013.01); G06F 3/0644 (2013.01); G06F 3/0679 (2013.01)

(58) Field of Classification Search
CPC ..... G06F 3/0611; G06F 3/0644; G06F 3/0679
See application file for complete search history.

(56) References Cited

U.S. PATENT DOCUMENTS 5,212,786 A 5/1993 Sathi
5,724,300 A 3/1998 Tanaka et al.
(Continued)

FOREIGN PATENT DOCUMENTS

CN 102623053 A 8/2012
JP 7-56800 A 3/1995
(Continued)

OTHER PUBLICATIONS

Axboe, "swap: fix swapfile read/write offset" index : kernel/git/torvalds/linux.git, Mar. 2021, Total 1 page.
(Continued)

*Primary Examiner* — Kalpit Parikh
(74) *Attorney, Agent, or Firm* — Sughrue Mion, PLLC

(57) ABSTRACT

A memory management method or an electronic device for managing memory is provided. The method may include checking available capacity to allocate new process to first memory. The method may include determining whether to swap out the page of the first process to the first memory or the second memory, based on the available capacity and characteristics of the first process that is running in the first memory. The method may include allocating, as a swap space, a partial region of the first memory or the second memory that is determined. The method may include swapping out the page of the first process from the first memory to the swap space. The method may include identifying whether the swapped-out page is swapped-in from the swap space to the first memory. The method may include releasing the swap space.

14 Claims, 11 Drawing Sheets

(56) References Cited

U.S. PATENT DOCUMENTS

| | | | |
|---|---|---|---|
| 5,734,913 | A | 3/1998 | Iwamura et al. |
| 5,778,419 | A | 7/1998 | Hansen et al. |
| 5,860,083 | A | 1/1999 | Sukegawa |
| 6,401,167 | B1 | 6/2002 | Barth et al. |
| 6,684,345 | B2 | 1/2004 | Harari et al. |
| 6,990,547 | B2 | 1/2006 | Ulrich et al. |
| 7,389,315 | B1 | 6/2008 | Scott |
| 8,484,405 | B2 | 7/2013 | Mashtizadeh et al. |
| 8,493,482 | B2 | 7/2013 | Cote et al. |
| 8,510,743 | B2 | 8/2013 | Hackborn et al. |
| 8,595,460 | B2 | 11/2013 | Bhat et al. |
| 9,195,581 | B2 | 11/2015 | Barbou-Des-Places et al. |
| 9,250,958 | B2 | 2/2016 | Mark et al. |
| 9,501,238 | B2 | 11/2016 | Yun et al. |
| 9,678,687 | B2 | 6/2017 | Woodward et al. |
| 9,712,319 | B2 | 7/2017 | Avanzi |
| 9,811,260 | B2 | 11/2017 | Bonzini et al. |
| 10,133,601 | B2 | 11/2018 | Apparao et al. |
| 10,216,536 | B2 | 2/2019 | Banerjee et al. |
| 10,423,435 | B1 | 9/2019 | Khafizov et al. |
| 10,635,337 | B2 | 4/2020 | Apparao et al. |
| 10,915,245 | B2 | 2/2021 | Stabrawa et al. |
| 11,409,648 | B2 | 8/2022 | Choi et al. |
| 2005/0268067 | A1* | 12/2005 | Lee .......................... G06F 12/10 711/208 |
| 2010/0023565 | A1* | 1/2010 | Colbert ............... G06F 9/45558 718/1 |
| 2012/0159111 | A1 | 6/2012 | Kim et al. |
| 2013/0262738 | A1 | 10/2013 | Kwon et al. |
| 2015/0347042 | A1 | 12/2015 | Kim et al. |
| 2016/0098203 | A1* | 4/2016 | Chang ...................... G06F 12/08 711/156 |
| 2020/0004677 | A1* | 1/2020 | Firoozshahian ...... G06F 3/0679 |
| 2021/0200463 | A1* | 7/2021 | Seo ........................ G06F 3/0679 |

FOREIGN PATENT DOCUMENTS

| | | | |
|---|---|---|---|
| JP | 2008-217208 | A | 9/2008 |
| KR | 10-2012-0069475 | A | 6/2012 |
| KR | 10-1371338 | B1 | 3/2014 |
| KR | 10-2015-0139017 | A | 12/2015 |
| KR | 10-1924022 | B1 | 2/2019 |
| KR | 10-2019-0117294 | A | 10/2019 |
| KR | 10-2020-0056046 | A | 5/2020 |
| KR | 10-2165460 | B1 | 10/2020 |
| KR | 10-2559784 | B1 | 7/2023 |
| WO | 2014/104509 | A1 | 7/2014 |

OTHER PUBLICATIONS

Larabel, "Google Proposes Multi-Generational LRU For Linux To Yield Much Better Performance," Mar. 2021, Total 2 pages.
Kay, "Linux Swap Space," Linux Journal, Feb. 2011, Total 11 pages.
Isy00dna, "swap linux," Hangeul's Blog, Nov. 2007, Total 3 pages.
Corbet, "2.6 swapping behavior," LWN.net, May 2004, Total 6 pages.
Zacchiroli, Programmation Systèmes, Cours 9—Memory Mapping, Nov. 2011, Total 81 pages (http://upsilon.cc/zack/teaching/1112/progsyst/).
Prep Insta, "Swapping in Operating System (OS)," 2022, Total 3 pages.
Zhu et al., "SmartSwap: High-performance and user experience friendly swapping in mobile systems," 2017 54th ACM/EDAC/IEEE Design Automation Conference (DAC), 2017, Total 3 pages.
Hahn et al., "FastTrack: Foreground App-Aware I/O Management for Improving User Experience of Android Smartphones," The Advanced Computing Systems Association, 2018 USENIX Annual Technical Conference, Jul. 2018, Total 14 pages.
Lebeck et al., "End the Senseless Killing: Improving Memory Management for Mobile Operating Systems," The Advanced Computing Systems Association, 2020 USENIX Annual Technical Conference, Jul. 2020, Total 16 pages.
Liang et al., "Acclaim: Adaptive Memory Reclaim to Improve User Experience in Android Systems," The Advanced Computing Systems Association, 2020 USENIX Annual Technical Conference, Jul. 2020, Total 15 pages.
Son et al., "ASAP: Fast Mobile Application Switch via Adaptive Prepaging," The Advanced Computing Systems Association, 2021 USENIX Annual Technical Conference, Jul. 2021, Total 15 pages.
"low memory killer daemon," Last updated Aug. 4, 2022, Total 4 pages.
Chen, "Why Mobile Applications Need UFS," Flash Memory Summit 2014, Santa Clara, CA, 2014, Total 7 pages.
Han et al., "A Hybrid Swapping Scheme Based On Per-Process Reclaim for Performance Per-Process Reclaim for Performance Improvement of Android Smartphones (Aug. 2018), " IEEE Access, vol. 6, pp. 56099-56108, 2018.
Larabel, "Zswap Could See Better Performance Thanks To A B-Tree Search Implementation," Nov. 2019, Total 1 page.
Wool, "[Patch] zswap: use B-tree for search," Nov. 2019, Total 5 pages.
Zhao, "[Patch v1 00/14] Multigenerational LRU," Mar. 2021, Total 4 pages.
Moon, "Swap -1- (Basic, initialization)," Oct. 2019, Total 30 pages.
Moon, "Zoned Allocator -6- (Watermark)," Jun. 2016, Total 23 pages.
Anonymous, "Chapter 10 Page Frame Reclamation," Jun. 2016, Total 7 pages.
Aixxe, "Loading, unloading & reloading shared libraries," Last updated Feb. 24, 2022, Total 5 pages.
Kerrisk, "dlopen(3)—Linux manual page," Linux/UNIX systems programming training, Linux Programmer's Manual, 2021, Total 5 pages.
Jung et al., "Performance Characterization of Prelinking and Preloading for Embedded Systems," Conference Paper, Jan. 2007, Total 9 pages.
Gorman, "Swap-over-NFS without deadlocking V9," Jul. 2012, Total 2 pages.
Anonymous, "Coreutils—GNU core utilities," Free Software Foundation, Inc. 2016, Total 2 pages.
Anonymous, "SwapSpace," openmokowiki, Last modified Aug. 15, 2010, Total 2 pages.
Anonymous, "What Swapspace does for you, Where it comes from, How it compares, and When not to use it," Swapspace—swap file manager for Linux, May 2020, Total 2 pages.
Mrchrisj, "Best way to disable the Swap File on Raspbian #20," Feb. 2016, Total 2 pages.
Anonymous, "Factory Images for Nexus and Pixel Devices," Last updated Dec. 5, 2022, Total 4 pages.
Google Pixel 5—Full phone specifications, Oct. 2020, Total 3 pages.
Qualcomm, "Snapdragon 765G 5G Mobile Platform," 2022, Total 7 pages.
Zhu et al., "Revisiting Swapping in Mobile Systems with SwapBench," Preprint submitted to Journal of Latex Templates, Apr. 2016, Total 41 pages.
Moon, "Zone Bitmap (API)," Apr. 2016, Total 7 pages.
International Search Report (PCT/ISA/210) and Written Opinion (PCT/ISA/237) issued by the International Searching Authority on Mar. 13, 2023 in corresponding International Application No. PCT/KR2022/020344.
Communication dated Mar. 26, 2025, issued by European Patent Office in European Patent Application No. 22911762.7.

* cited by examiner

FIG. 3

START

CHECK AVAILABLE CAPACITY OF FIRST MEMORY — S510

DETERMINE, BASED ON CHARACTERISTIC OF PROCESS, WHETHER TO SWAP-OUT TO FIRST MEMORY OR SECOND MEMORY — S520

ALLOCATE SWAP SPACE TO FIRST MEMORY OR SECOND MEMORY — S530

SWAP-OUT PAGE OF PROCESS — S540

IDENTIFY WHETHER PAGE OF PROCESS IS SWAPPED-IN — S550

RELEASE SWAP SPACE OF FIRST MEMORY OR SECOND MEMORY — S560

END

MEMORY MANAGEMENT METHOD AND ELECTRONIC DEVICE USING THE SAME

CROSS-REFERENCE TO RELATED APPLICATIONS

This application is a continuation application of International Application No. PCT/KR2022/020344, filed on Dec. 14, 2022, in the Korean Intellectual Property Office, which is based on and claims priority to Korean Patent Application No. 10-2021-0186591, filed on Dec. 23, 2021, and to Korean Patent Application No. 10-2022-0075779, filed on Jun. 21, 2022, in the Korean Intellectual Property Office, the disclosures of each of which being incorporated by reference herein in their entireties.

BACKGROUND

1. Field

The disclosure relates to an electronic device for securing available memory capacity and an operating method of the electronic device.

2. Description of Related Art

As more and more applications are installed and executed in portable electronic devices such as smart phones, various memory management techniques are used to secure available memory capacity.

Out-Of-Memory Killer (OOMK) is a memory management technique that sequentially forcibly terminates low-priority processes to prevent system interruption. However, OOMK makes the user experience worse because OOMK kills running processes without permission of a user.

A swap technique, which is another memory management method, is a memory management technique for securing available memory capacity without terminating a process by transferring data that are recently not used, from a volatile memory region (e.g., random access memory (RAM)) to a certain region of the volatile memory and a non-volatile memory (e.g., a NAND flash storage device).

However, as the size of applications is growing more and more, and users install more applications, the insufficient memory capacity despite swapping frequently causes OOMK, deteriorating the user experience.

In particular, the increase in the number of applications of a user not only deteriorates application response speed, but also accelerates memory competition between the applications. In a smartphone environment, application execution speed and application response speed are what smartphone users demand the most. As memory competition between applications increases, the execution speed of applications rapidly decreases. Therefore, there is a need for a technology that provides an improved user experience in a mobile environment through a new memory management method.

SUMMARY

In an embodiment, an electronic device for managing memory is provided. In an embodiment, the electronic device may include a first memory, a second memory. The electronic device may include a least one processor configured to execute a first process by loading, to the first memory, a page of pages of the first process related to an application stored in the second memory. The at least one processor may be further configured to check available capacity to allocate new process to first memory. The at least one processor may be further configured to determine whether to swap out the page of the first process to the first memory or the second memory, based on the available capacity, and characteristics of the first process that is running in the first memory. The at least one processor may be further configured to allocate, as a swap space, a partial region of the first memory or the second memory that is determined. The at least one processor may be further configured to swap-out the page of the first process from the first memory to the swap space. The at least one processor may be further configured to identify whether the swapped-out page is swapped-in from the swap space to the first memory. The at least one processor may be further configured to release the swap space.

In an embodiment, a memory management method of an electronic device is provided. In an embodiment, the method may include checking available capacity to allocate new process to first memory. In an embodiment, the method may include determining whether to swap out the page of the first process to the first memory or the second memory, based on the available capacity and characteristics of the first process that is running in the first memory. In an embodiment, the method may include allocating, as a swap space, a partial region of the first memory or the second memory that is determined. In an embodiment, the method may include swapping out the page of the first process from the first memory to the swap space. In an embodiment, the method may include identifying whether the swapped-out page is swapped-in from the swap space to the first memory. In an embodiment, the method may include releasing the swap space.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a structural block diagram for describing an electronic device for securing available capacity of a memory, according to an embodiment;

DETAILED DESCRIPTION

Figure 1:
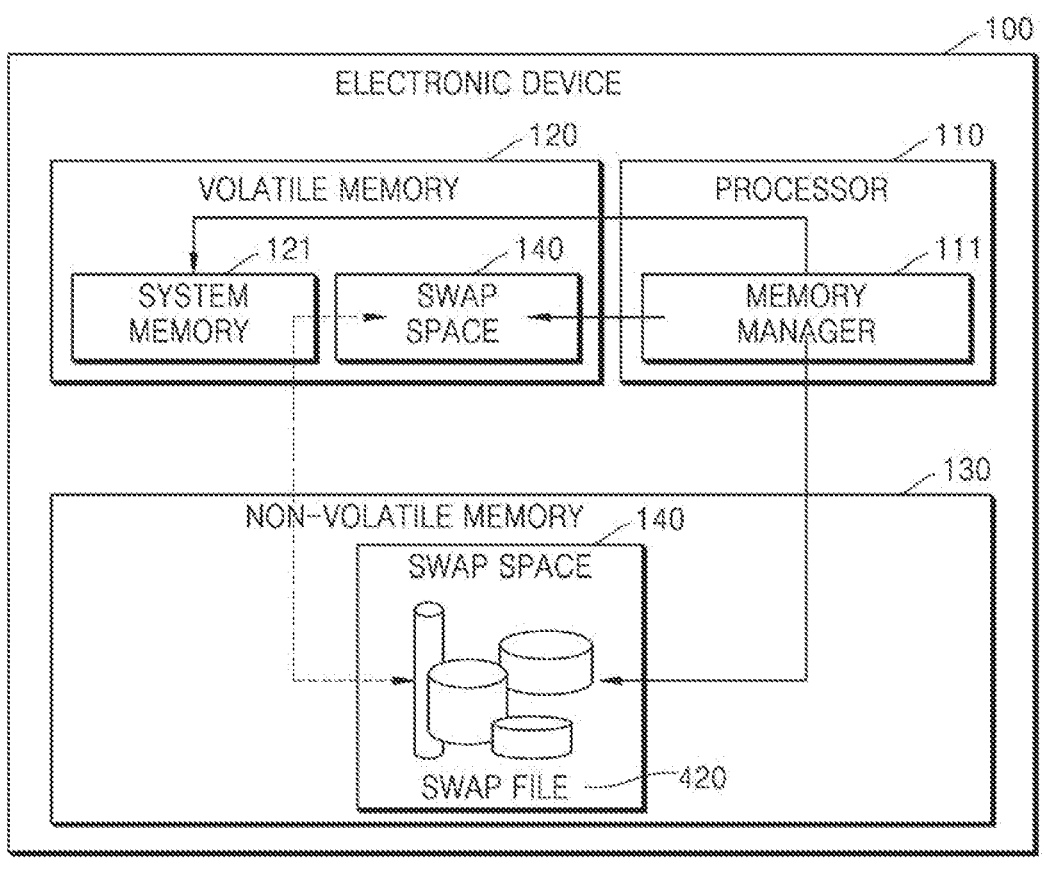
FIG. 1 is a diagram illustrating a memory management method according to an embodiment.

Throughout the disclosure, the expression "at least one of a, b or c" indicates only a, only b, only c, both a and b, both a and c, both b and c, all of a, b, and c, or variations thereof.

Hereinafter, the terms used in the disclosure will be briefly described, and then an embodiment will be described in detail.

The terms used in the disclosure are those general terms currently widely used in the art in consideration of functions in regard to an embodiment, but the terms may vary according to the intention of those of ordinary skill in the art, precedents, or new technology in the art. Also, specified terms may be selected by the applicant, and in this case, the detailed meaning thereof will be described in the detailed description of an embodiment. Thus, the terms used in the disclosure should be understood not as simple names but based on the meaning of the terms and the overall description of the disclosure.

It should be understood that, when a part "comprises" or "includes" an element in the specification, unless otherwise defined, other elements are not excluded from the part and the part may further include other elements. In addition, the term "unit" used in the specification may denote an element composed of hardware, such as a field programmable gate array (FPGA) or an application-specific integrated circuit (ASIC), or software and may perform a particular task. However, "unit" is not intended to be limited to software or hardware. The term "unit" may be configured to be in an addressable storage medium or configured to operate one or more processors. Accordingly, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and "units" may be combined into fewer components and "units" or further separated into additional components and "units".

Hereinafter, the disclosure will be described more fully with reference to the accompanying drawings, in which exemplary embodiments of the disclosure are shown such that one of ordinary skill in the art may easily work the disclosure. The embodiment may, however, be embodied in many different forms and should not be construed as limited to the embodiments set forth herein. Also, elements not related to description are omitted in the drawings for clear description of the disclosure, and like reference numerals in the drawings denote like elements throughout the disclosure.

Throughout the specification, when a portion is "connected" to another portion, the portion may be connected to the other portion not only directly but also electrically through another portion interposed therebetween. Also, when a portion may "include" a certain constituent element, unless specified otherwise, it may not be construed to exclude another constituent element but may be construed to further include other constituent elements.

In the disclosure, 'swap' may refer to an operation of moving data that is at least temporarily stored in a main memory device, to another region of the main memory device or an auxiliary memory device and storing the data. In an embodiment, when a new application cannot be executed due to a capacity occupied by an application that is already running in a main memory device, the running application in the main memory or a process that is a part thereof may be swapped. For example, the main memory device may be volatile memory, and the auxiliary memory device may be non-volatile memory.

In the disclosure, a 'swap space' may refer to a region of a memory, in which data stored in the main memory device may be moved and stored when the available capacity of the main memory device for executing a process is insufficient. In an embodiment, the swap space may be a partial region of the main memory device or a partial region of the auxiliary memory device.

In the disclosure, 'swap-out' may refer to an operation of moving data of a main memory device to a swap space. In an embodiment, available capacity of the main memory device may be secured by swapping out a process running in the main memory device, to the swap space.

In the disclosure, 'swap-in' may refer to an operation of moving data moved to the swap space, back to the main memory device. In an embodiment, a process stored in the swap space may be swapped in back into the main memory device, and the process may be executed again on the main memory device.

In the disclosure, a shared object (SO) page may refer to a shared object file when a shared object file (.so file) of a shared library is loaded into a memory.

Various embodiments will now be described in detail with reference to the attached drawings.

FIG. 1 is a diagram illustrating a memory management method according to an embodiment. Referring to FIG. 1, an electronic device 100 may include a processor 110, a volatile memory 120, a non-volatile memory 130, and the like.

The processor 110 according to an embodiment may include a memory manager 111. When an application is newly executed, the memory manager 111 may allocate a partial region of a system memory 121 in the volatile memory 120 to the application.

In some embodiments, the memory manager 111 may dynamically adjust a size of a swap space 140 so that data of the application is maintained in the swap space for as long as possible. For example, the memory manager 111 may check the available capacity of a region of the system memory 121, and when the available capacity is insufficient, the memory manager 111 may allocate a partial region of the volatile memory 120 and/or the non-volatile memory 130 as a swap space 140 to swap-out some data of a running application. For example, in some embodiments, the swap space 140 may be provided with a portion in the volatile memory 120 and another portion in the non-volatile memory 130, as illustrated in FIG. 1. For example, the memory manager 111 may swap-out a portion of data of an application running in the system memory 121, to a swap space 140 in units of swap files 420. The swap space 140 may increase whenever the swap file 420 is swapped out. The swap file 420 may refer to a unit of a file that may be swapped out and swapped in, and includes several pages.

In some embodiments, when the swap space 140 is not required, the size of the swap space 140 may be reduced. For example, when all pages of the swap space 140 are swapped in and thus the swap space 140 is empty, the memory manager 111 may immediately release the dynamically allocated swap space 140. Through the dynamic allocation of a swap space as described above, the frequency of forcibly terminating applications may be reduced by delaying the existing Out-Of-Memory Killer (OOMK) occurrence. Accordingly, the responsiveness of applications may be improved, and thus, the user experience may be improved.

When the swap space 140 is insufficient even after dynamically allocating the swap space, the memory manager 111 according to an embodiment may remove an SO page of the volatile memory 120 to secure the storage space. For example, in some embodiments, the memory manager 111 may scan an SO page stored in the volatile memory 120, and when an SO page that is not shared by multiple applications is found, the memory manager 111 may remove the same. Removal of a page is simpler and less expensive than swap-out because removal does not require additional input/output (I/O) operations. For another example, in some embodiments, the memory manager 111 may remove files that are not swapped in for a preset period (e.g., 7 days or 30 days) among files swapped out to the non-volatile memory 130. A file may include SO pages. In some embodiments, when the size of an available swap space falls to or below a threshold value, SO pages may be periodically removed to secure the swap space. The threshold value may be predetermined.

The memory manager 111 according to an embodiment may terminate some of applications that are loaded into the system memory 121 and running, when available memory capacity is insufficient even after the SO pages are removed. For example, the memory manager 111 may calculate a time for each application to be driven, and determine an order of terminating of applications in the order of applications having a shorter driving time. In detail, the time for an application to be driven may be calculated by adding a Shared Object (SO) symbol search time and the extensible Markup Language (XML)-User Interface (UI) conversion time when the application is first executed.

The SO symbol search time may refer to a time taken to find an SO symbol for driving an application in a dynamic shared library. The XML-UI conversion time may refer to a time required to convert XML into UI when an application is driven.

Figure 2:
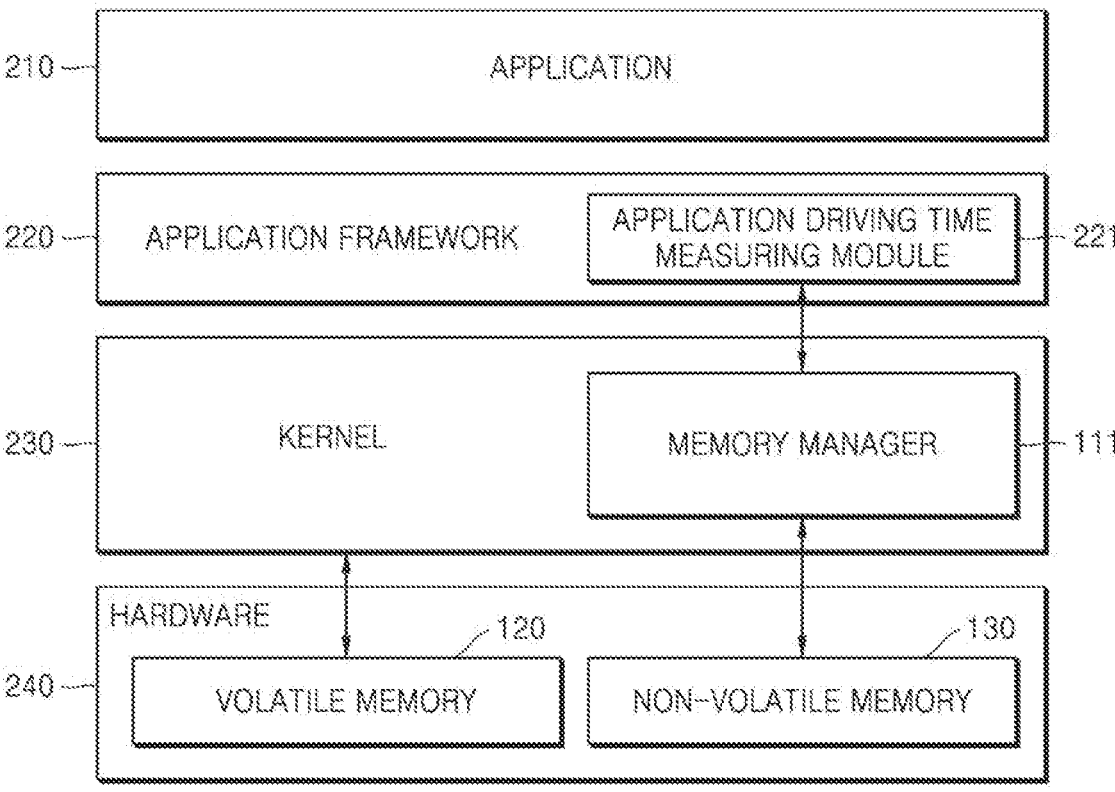
FIG. 2 is a diagram for describing an overall system structure according to an embodiment.

FIG. 2 is a diagram for describing an overall system structure according to an embodiment.

The system hierarchy may be largely divided into an application layer 210, an application framework layer 220, a kernel layer 230, and a hardware layer 240.

When a certain application is executed in the application layer 210, an application driving time measurement module 221 on the application framework layer 220 may calculate the operating cost of the application. For example, the initialization cost such as SO symbol search and XML-UI conversion for driving an application may be measured, and a calculated value thereof may be transmitted to the memory manager 111 of the kernel layer 230.

The kernel layer 230 may connect the application framework layer 220 to the hardware layer 240. In detail, storage spaces of the volatile memory 120 and the non-volatile memory 130 of the hardware layer 240 are managed through the memory manager 111.

Figure 3:
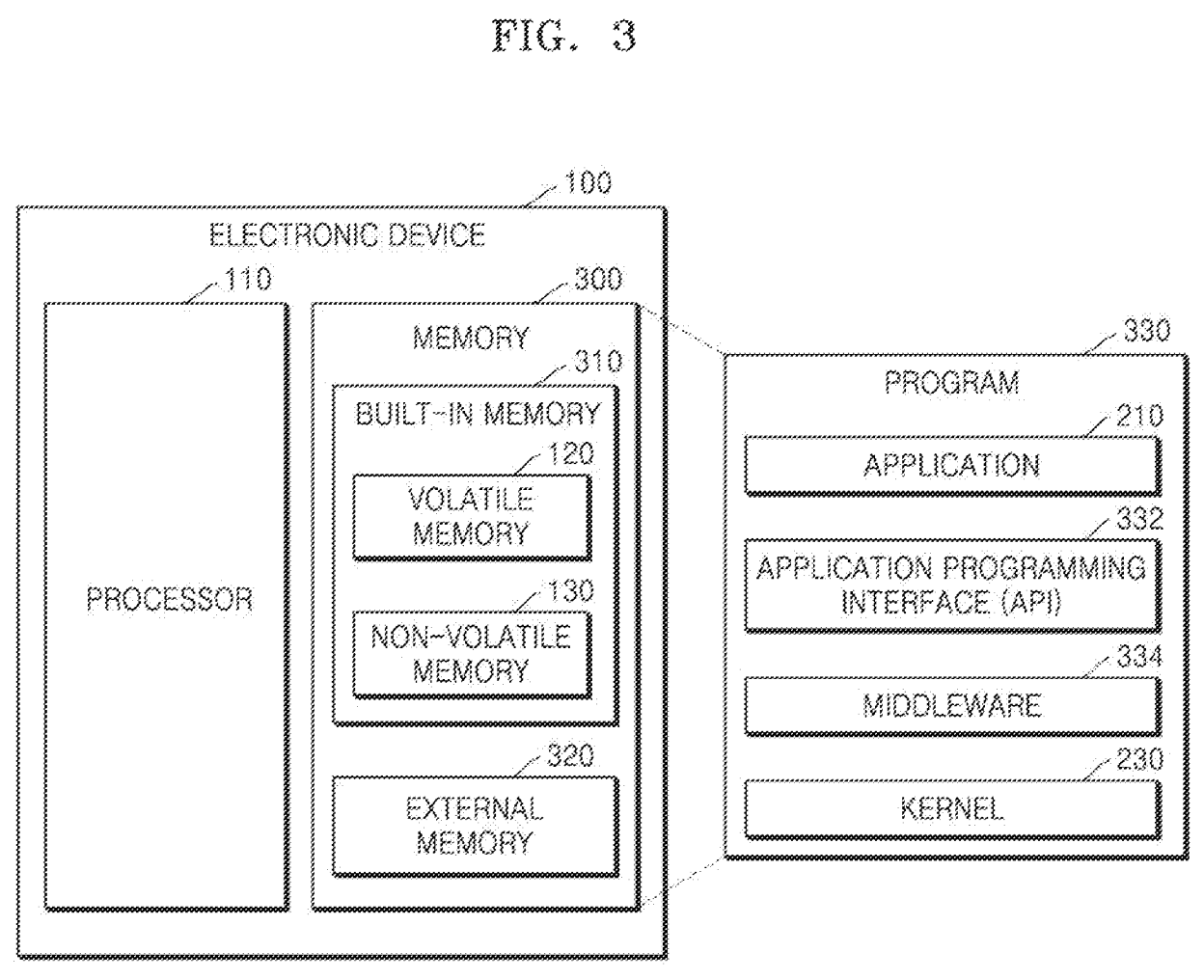

FIG. 3 is a structural block diagram for describing an electronic device for securing available memory capacity, according to an embodiment.

The electronic device 100 according to an embodiment is an electronic device capable of performing memory management, and in particular, may be an electronic device that performs memory management through a program 330. Referring to FIG. 3, the electronic device 100 according to an embodiment may include the processor 110 and a memory 300. Hereinafter, the components above will be described in turn.

The processor 110 may control the overall operation of the electronic device 100, and may control the operation of the electronic device 100 by executing one or more instructions stored in the memory 300. The processor 110 may read a command received from other components of the electronic device 100 and execute an operation or data processing according to the command. The processor 110 is a hardware subject of an operation for performing all operations of the electronic device 100. The processor 110 performs arithmetic, processing, and control of data so that software is executed. For example, the processor 110 may execute an operating system or a kernel of the electronic device 100, and also execute an application on the kernel so as to perform various processes.

The processor 110 according to the embodiment may execute one or more instructions stored in the memory 300 to check available capacity for allocating a new process to the volatile memory 120, and identify, based on the characteristics of a process running in the volatile memory 120, whether to swap-out a page of the running process to the volatile memory 120 and/or the non-volatile memory 130, allocate a partial region of the volatile memory 120 and/or the non-volatile memory 130 as a swap space, swap-out the page of the running process, check whether the swapped-out page is swapped-in again to the volatile memory 120, and release the swap space of the volatile memory 120 and/or the non-volatile memory 130.

The processor 110 according to an embodiment may execute one or more instructions stored in the memory 300 to identify, by further considering the number of times the page of the running process is referred to by a plurality of processes in addition to the characteristics of the running process, whether to swap-out the page of the running process to the volatile memory 120 and/or the non-volatile memory 130.

When the swap space of the volatile memory 120 is insufficient, the processor 110 according to an embodiment may execute one or more instructions stored in the memory 300 to determine a first page among pages of a running process, based on the number of times that the page of the running process is referred, and remove the first page from the volatile memory 120.

When the swap space of the non-volatile memory 130 is insufficient, the processor 110 according to an embodiment may execute one or more instructions stored in the memory 300 to determine a second page among pages written to the non-volatile memory 130, based on a time when the pages written to the non-volatile memory 130 are swapped out to the non-volatile memory 130, and remove the second page from the non-volatile memory 130.

When the available capacity for allocating a new process in the volatile memory 120 is insufficient, the processor 110 according to an embodiment may execute one or more instructions stored in the memory 300 to calculate a time for each of a plurality of applications to be driven, the plurality of processes running in the volatile memory 120, and determine an order of terminating the plurality of processes running in the volatile memory 120, based on the calculated time(s), and terminate at least one process among the plurality of processes running in the volatile memory 120 so that a storage region of the volatile memory 120 where data of the terminated process is loaded may be used by other processes.

The memory 300 may include a built-in memory 310 and an external memory 320 that is external to the built-in memory 310.

According to an embodiment, the built-in memory 310 may be a solid state drive (SSD). The built-in memory 310 may include the volatile memory 120 and the non-volatile memory 130. For example, the volatile memory 120 may be a dynamic RAM (DRAM), a static RAM (SRAM), a synchronous dynamic RAM (SDRAM), or the like, and the non-volatile memory 130 may be a NAND flash memory, a NOR flash memory, or the like.

The external memory 320 may further include a flash drive, for example, compact flash (CF), secure digital (SD), micro secure digital (Micro-SD), mini secure digital (Mini-SD), extreme digital (xD), etc. The external memory 320 may be functionally connected to the electronic device 100 through various interfaces. According to an embodiment, the electronic device 100 that includes the external memory 320 may further include a storage device (or storage medium) such as a hard drive.

The memory 300 may store the program 330 for processing and controlling the processor 110. The memory 300 according to an embodiment may store one or more instructions.

The memory 300 according to an embodiment may include a programming module such as a kernel 230, middleware 334, an application programming interface (API) 332, or an application 210. At least a portion of the kernel 230, the middleware 334, or the API 332 may be referred to as an operating system (OS).

The kernel 230 may control or manage system resources (e.g., the processor 110 or the memory 300) used to execute operations or functions implemented in other programming modules (e.g., middleware, API, or application) other than the kernel. The kernel 230 may provide an interface through which the middleware 334, the API 332, or the application 210 may access and control or manage individual components of the electronic device 100. The kernel 230 may include the memory manager 111 of FIG. 2 for memory management in terms of software.

The middleware 334 may play an intermediary role so that the API 332 or the application 210 communicates with the kernel 230 to exchange data. In some embodiments, the middleware 334 may process one or more work requests received from the application according to priority. In relation to the work requests received from the application, the middleware 334 may assign a priority for using the system resources of the electronic device 100 to at least one or more of the applications to control the work requests (e.g., scheduling or load balancing).

The application programming interface (API) 332 is an interface for the application 210 to control a function provided by the kernel 230 or the middleware 334. For example, the API 332 may include at least one interface or function (e.g., an instruction) for file control, window control, image processing, or text control.

The application 210 may include an SMS/MMS application, an e-mail application, a calendar application, an alarm application, an image playback application, a stock and investment-related application, a health care application (e.g., an application for measuring an amount of exercise or blood sugar), an environment information application (e.g., an application that provides information on the air pressure, humidity, or temperature), or the like.

However, not all of the illustrated components in FIG. 3 are essential components. The electronic device 100 may be implemented by more components than the illustrated components, or the electronic device 100 may be implemented by fewer components than the illustrated ones.

Figure 4:
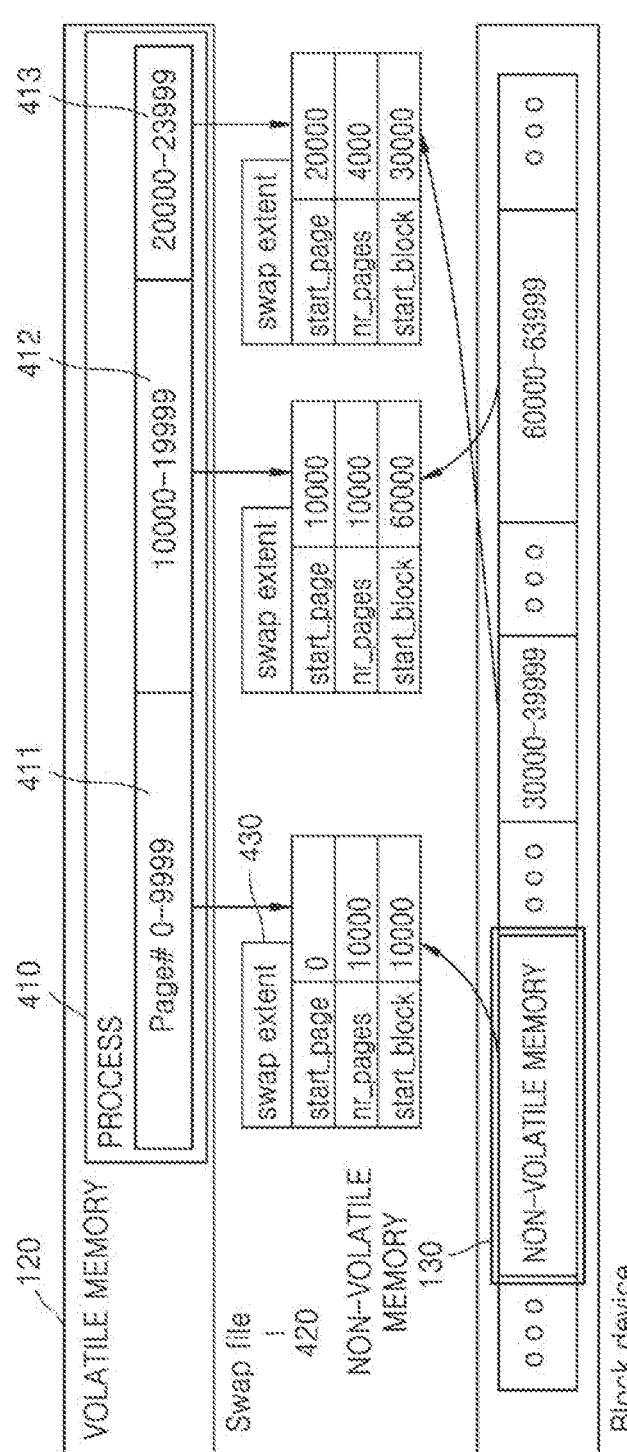
FIG. 4 is a detailed diagram illustrating a method of securing available memory capacity, according to an embodiment.

FIG. 4 is a detailed diagram illustrating a method of securing available memory capacity, according to an embodiment.

Referring to FIG. 4, the processor 110 of the electronic device 100 may swap-out data stored in a memory to the swap space 140. The memory may include, but is not limited to, the volatile memory 120, the non-volatile memory 130, the external memory 320, and the like. The swap space 140 may be, for example, a partial space of the volatile memory 120 and/or a partial space of the non-volatile memory 130, but is not limited thereto. The data may include, but is not limited to, data used by a process or application run by the processor 110, and a dynamic library file. For example, data may be processed in units (e.g., pages) of a specified size (e.g., 4 Kbytes). For convenience of description, a case in which a data unit is a page will be described as an example. A page may include, but is not limited to, a heap, a stack, a shared memory, a shared object (SO) page, and the like.

In an embodiment, the processor 110 may swap-out a process stored in the volatile memory 120, to the non-volatile memory 130 in units of swap files 420. The swap files 420 may refer to a unit of a file that may be swapped out and swapped in, and includes several pages. The number of swap files 420 may be determined according to the size of a process and the size of the swap space 140, and may be one or more. For example, when the size of a process that is loaded into RAM and running is 96 Mbytes (24,000 pages), the swap files 420 may be divided into three. For example, in some embodiments, the swap files 420 may include three swap files 420. Each of the swap files 420 may include a variable number of pages. For example, in some embodiments, the three swap file 420 may include 10,000 pages, 10,000 pages, and 4,000 pages, respectively.

Information for each swap file 420 may be mapped to an address of the non-volatile memory 130 at the operating system level. For example, the swap files 420 may be stored at a specific address of the non-volatile memory 130 by using a mapping table called a swap extent 430.

In some embodiments, the swap extent may include start page, nr_pages, and start_block. Start_page determines a first page of the swap files 420, nr_page determines the number of pages constituting the swap files 420, and start_block determines a start position where the swap files 420 are stored in the non-volatile memory 130. For example, a first swap file 411 starts with page 0 among pages of a process (start_page 0) and includes 10,000 pages (nr_pages 10000), and is saved by having 10,000 be a start position among block addresses of the non-volatile memory 130 (start_block 10000). In other words, the first swap file 411 is saved in addresses 10,000 to 20,000 of the non-volatile memory 130.

In an embodiment, the processor 110 stores a swap file based on the lifetime of the non-volatile memory 130. The non-volatile memory 130 may be configured in units of blocks, and a block may include multiple cells. For example, one block may include 100 cells. As the lifetime of a NAND flash is limited due to the characteristics of a semiconductor device, the processor 110 may store swap files in a priority order of unused blocks. The swap files 420 are not necessarily stored in continuous blocks. For example, referring to FIG. 4, in some embodiments, the first swap file 411 may be stored with a block address of 10,000 of the non-volatile memory 130 as a starting position, and a second swap file 412 is stored with a block address of 60,000 as a starting position, and a third swap file 413 is stored with a block address of 30,000 as a starting position.

Figure 5:
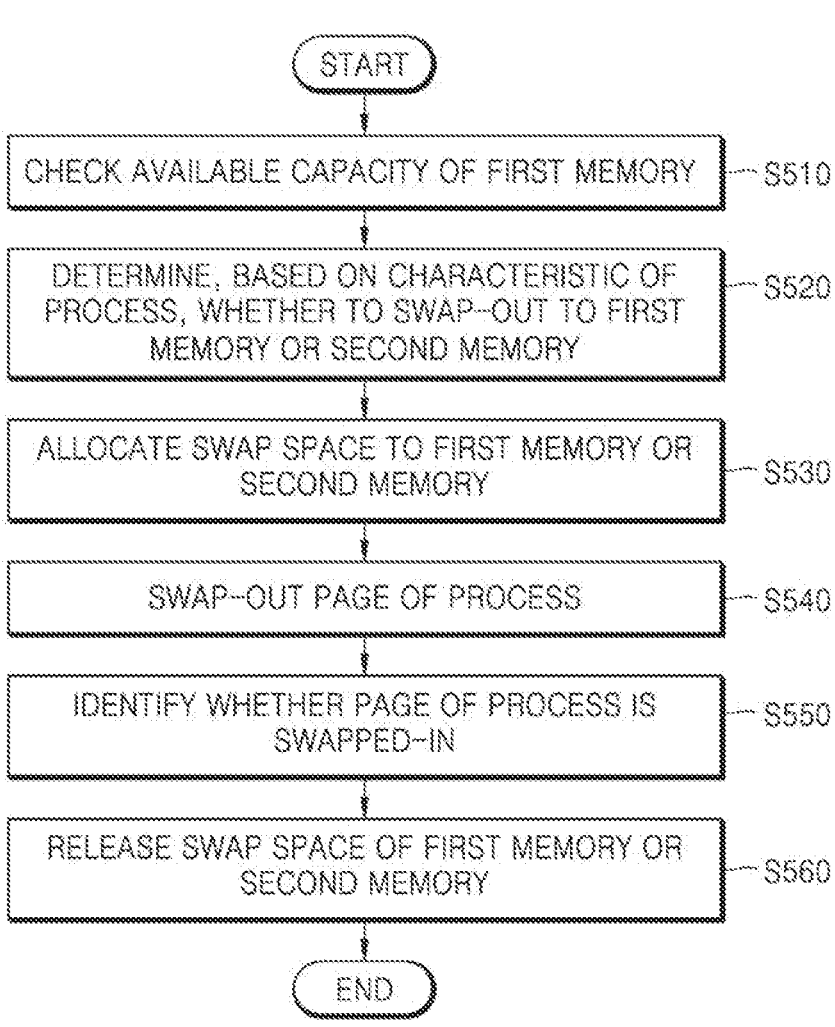
FIG. 5 is a diagram for describing a method of determining an order of terminating processes by calculating a time required for each process that is running, according to an embodiment.

FIG. 5 is a flowchart of a method for securing available memory capacity, according to an embodiment.

In operation S510, the electronic device 100 checks an available capacity of a first memory.

In an embodiment, the electronic device 100 may check available capacity to allocate a new process to the first memory. For example, the electronic device 100 may check spare space of the first memory in order to load a process stored in the second memory into the first memory. The new process may mean a different process from the first process. Also, it may mean a process that is not stored in the first memory.

In an embodiment, the first memory may be a volatile memory, for example the volatile memory 120 described above. In an embodiment, the second memory may be a non-volatile memory, for example the non-volatile memory 130 described above.

In operation S520, the electronic device 100 may identify whether to swap-out a process to the first memory or the second memory, based on a characteristic of the first process.

In an embodiment, the electronic device 100 may determine whether to swap out pages of the first process to the first memory or the second memory based on the checked available capacity and the characteristics of the first process running in the first memory.

In other words, in some embodiments, the electronic device 100 may determine the first memory or the second memory (i.e., one of the first memory and the second memory) as a swap-out target for the swap-out of the process, based on the characteristic of the first process.

In an embodiment, the characteristic of the first process may be determined according to the characteristics of an application including the first process. For example, the characteristics of the first process may include, but are not limited to, at least one of a reaction time of the first process or a degree of state preservation of the first process.

In an embodiment, since a swap-out of the first process that is being loaded into the first memory to a swap space of the first memory is faster than swap-out of the first process to a swap space of the second memory, in the case of an application, which is of a type for which an execution time matters (for example, a messenger application), the user experience may be improved by allocating a swap space to the first memory. In other words, in some embodiments, since a swap-out of the first process from the first memory to a swap space of the first memory is faster than a swap-out of the first process from the first memory to a swap space of the second memory, the electronic device 100 may determine the first memory as the swap-out target when the application is an application for which an execution time matters.

In operation S530, the electronic device 100 may allocate the swap space 140 to the first memory or the second memory. For example, the electronic device 100 may allocate the swap space 140 to the first memory or the second memory that is determined.

In an embodiment, the electronic device 100 may allocate a partial area of the first memory or the second memory as a swap space. For example, if the electronic device 100 may identify that the available capacity of the first memory is insufficient and determines to swap out the first process to the first memory, a portion of the first memory is allocated as a swap space can do. In addition, if the electronic device 100 determines that the available capacity of the first memory is insufficient and swaps out the first process to the second memory, the electronic device 100 may allocate a partial area of the second memory as a swap space.

In an embodiment, the electronic device 100 may allocate the swap space 140 to a memory by a required size. When a portion of the space of the first memory is divided into physically fixed partitions and used as the swap space 140, the storage space of the first memory may be wasted when the swap space is not used. When only a fixed storage space is used as the swap space 140 in a memory, and when the swap space 140 is insufficient, the process is forcibly terminated by the OOMK operation, such that the user experience deteriorates.

However, according to an embodiment, the electronic device 100 may dynamically secure a swap space as much as the size of a process or page to be swapped out (e.g., in units of files or pages). For example, since there are no fixed partitions, data may be stored by allocating an additional swap space whenever necessary. In this way, the OOMK operation in which the running process is forcibly terminated may be delayed as much as possible. In other words, in some embodiments, the electronic device 100 may dynamically secure the swap space in the first memory and/or the second memory as much as the size of the process or page to be swapped out. For example, in some embodiments, the data may be stored by allocating a swap space in the first memory and then allocating an additional swap space in the second memory based on the size of the processor or page, whenever necessary.

In operation S540, the electronic device 100 may swap-out a page of the first process to the first memory or the second memory that has been allocated. In an embodiment, the electronic device 100 may swap out a page of the first process from the first memory to the swap space. For example, when a partial area of the first memory is allocated as a swap space, a page of the first process may be allocated to a partial area of the first memory allocated as the swap space. Also, when a partial area of the second memory is allocated as a swap space, a page of the first process may be allocated to a partial area of the second memory allocated as the swap space. In an embodiment, all pages or a portion of pages of the process may be swapped-out. In an embodiment, an SO page may be swapped-out earlier than general (i.e., non-SO) pages. Considering that an SO page is highly likely to be called by other applications, by swapping out the SO page to the swap space dynamically and earlier than general pages, forcible termination of the process including the SO page due to OOMK may be prevented.

In operation S550, the electronic device 100 checks whether a page of the swap space 140 is swapped in. In an embodiment, when a user desires to run a once-run application (e.g., the first process) again, the page swapped out to the swap space 140 may be swapped in again to the volatile memory 120.

In operation S560, the electronic device 100 releases the swap space 140 of the first memory or the second memory that has been allocated. In an embodiment, the electronic device 100 may identify whether the swapped-out page is swapped-in from the swap space to the first memory. The swapped-out page may be a page of the first process. When allocating a fixed swap space and/or when the swap space is empty because a process is swapped in, a partial space of a memory is counted as the swap space, such that the storage space is wasted.

In an embodiment, the electronic device 100 may release the second memory or the swap space allocated to the second memory when it is identified that the page swapped out to the swap space is swapped in to the first memory. In an embodiment, when a partial swap space of a memory is emptied through swap-in, the electronic device 100 may immediately release the swap space of the memory and use the same as a typical storage space.

Figure 6:
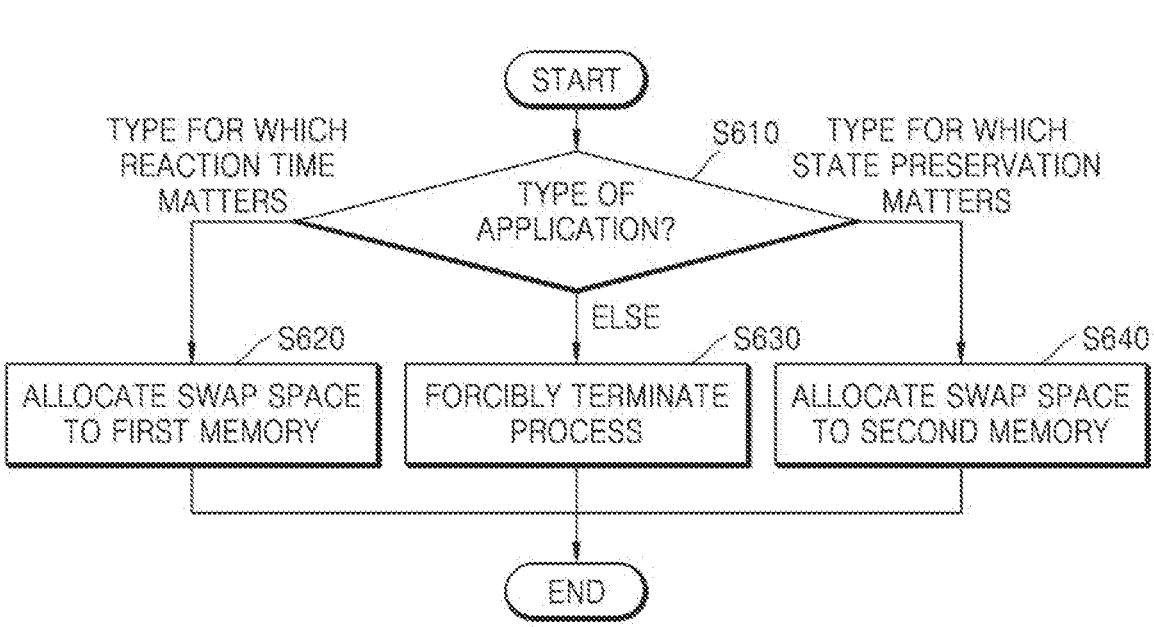
FIG. 6 is a flowchart of a method for securing available memory capacity, according to an embodiment.

FIG. 6 is a flowchart of a memory management method performed according to a type of application, according to an embodiment.

In operation S610, the electronic device 100 may determine a type of the application that is running in a first memory. For example, the type of an application may be determined based on at least one of a reaction time of the application or a degree of state preservation of a process of the application, but embodiments are not limited thereto.

In an embodiment, an application type may be determined according to a classification standard or according to a frequency or pattern of using the application by the user of the electronic device 100. The classification standard may be preset. For example, application types for which a reaction time matters are a messenger application, an SNS application, etc. For example, application types for which state preservation matters are stock applications, financial applications, image playback applications, internet applications, but embodiments are not limited thereto. In some embodiments, classification of application types may vary according to users.

In operation S620, for an application type for which a reaction time matters, the electronic device 100 may allocate a swap space to the first memory to swap-out the application or some processes of the application. For example, when the swap space is allocated to the first memory in which the application is loaded, swap-in and swap-out may be performed faster than when the swap space is allocated to another memory other than the first memory, and thus, the re-execution speed of the process may be increased. For example, when allocating the swap space to the volatile memory 120 rather than allocating the swap space to the non-volatile memory 130, swap-in and swap-out may be performed faster and thus may increase the re-execution speed of the process, and accordingly, the first memory may be the volatile memory 120.

In operation S630, when the type of the application is not the type for which the reaction time matters or a type for which state preservation matters, the electronic device 100 may forcibly terminate the application or some processes of the application to secure a storage space. For example, in the case of an application that does not belong to classification criteria previously set in the electronic device 100, because there is no need to swap-out, an OOMK operation is executed to forcibly terminate the application.

In operation S640, for an application for which state preservation matters, the electronic device 100 may allocate a swap space to a second memory in order to swap-out the application or some of processes or some pages of the application.

Figure 7:
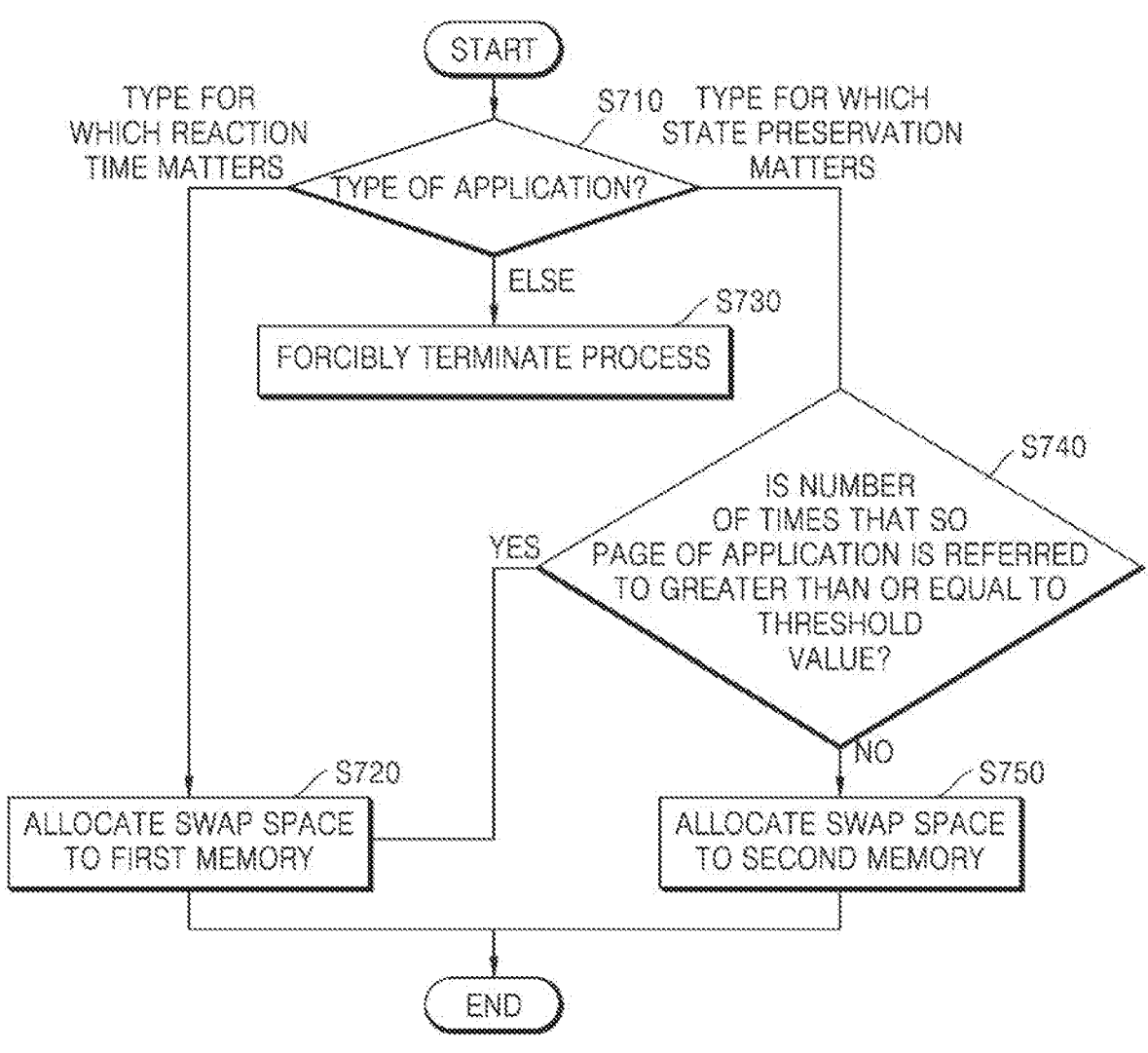
FIG. 7 is a detailed flowchart of a method of securing available memory capacity, according to an embodiment.

FIG. 7 is a detailed flowchart of a memory management method performed according to an application type, according to an embodiment.

In operation S710, the electronic device 100 may determine a type of the application that is running in a first memory. For example, the type of an application may be determined based on characteristics of the application. As discussed above, the type of the application may be determined based on at least one of the reaction time of the application or the degree of state preservation of a process of the application, but embodiments are not limited thereto. Operation S710 may correspond to operation S610 in FIG. 6.

In operation S720, for an application type for which the reaction time matters, the electronic device 100 may allocate the swap space to the first memory to swap-out the application or some processes or some pages of the application. For example, when the first memory is the volatile memory 120, swap-in and swap-out may be performed faster than allocating the swap space to the non-volatile memory 130, and thus, the re-execution speed of the process may be increased. Operation S720 may correspond to operation S620 in FIG. 6.

In operation S730, when the application type is not the type for which the reaction time matters or a type for which state preservation matters, the application or some processes of the application may be forcibly terminated to secure a storage space. For example, in the case of an application that does not belong to the classification criteria set in the electronic device 100, as there is no need to swap-out, OOMK is executed to forcibly terminate the corresponding application. Operation S730 may correspond to operation S630 in FIG. 6.

In operation S740, for an application type, for which state preservation matters, the electronic device 100 checks whether a number of times an SO page of the application is referred to by other applications is greater than or equal to a threshold value. The threshold value may be preset. When the number of times of the SO page being referred to is greater than or equal to the threshold value, a swap space is allocated to the first memory in operation S720 in order to swap-out the application or some processes or some pages of the application. For example, the more the other applications refer to the SO page of the corresponding application, the faster the swap-in and swap-out may be performed in the case of allocating the swap space to the first memory where the application is loaded, than when allocating the swap space to another memory, and thus, the in re-execution of the application may be increased.

In operation S750, when the number of times the SO page of the application is referred to by other applications is not greater than or equal to the threshold value, the electronic device 100 allocates a swap space to a second memory in order to swap-out the application or some processes or some pages of the application.

Figure 8:
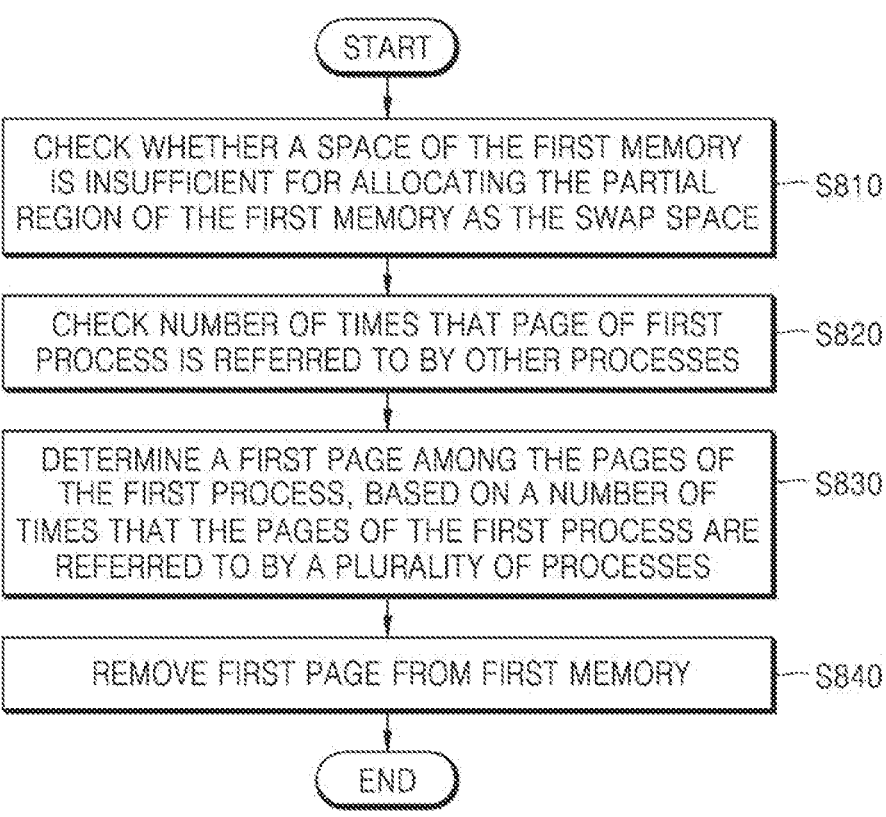
FIG. 8 is a detailed flowchart of a method of removing a page from a memory, according to an embodiment.

FIG. 8 is a detailed flowchart of a method of removing a page from a memory, according to an embodiment. FIG. 8 illustrates a detailed operation of operation S530 of FIG. 5.

In operation S810, the electronic device 100 may check whether the swap space of the first memory is sufficient. In an embodiment, when allocating a partial region of the first memory as a swap space, the electronic device 100 checks whether a space for dynamically securing the swap space of the first memory (e.g., the volatile memory 120) has reached a physical limit. In detail, the electronic device 100 checks whether, although it was attempted to additionally allocate the swap space of the first memory according to FIG. 5, but whether a space of the first memory has reached a physical limit and no more swap space can be secured.

In operation S820, the electronic device 100 may check the number of times a page of the first process is referred to by other processes. In other words, the electronic device 100 may check the number of times a page of the first process that is loaded and being executed in referred to by other processes.

In operation S830, the electronic device 100 may determine a first page for which the number of referral times is less than or equal to a threshold value, among pages written to the first memory. The threshold value may be preset. In an embodiment, the threshold value may be increased n times whenever a memory space is insufficient. For example, a page, which is referred to by a process one time, may be initially determined as the first page. When the memory space is still insufficient even after that, a page that is referred to twice may be determined as the first page, and so on.

In operation S840, the electronic device 100 may remove the first page from the first memory. In an embodiment, the first page may include an SO page or a certain page. Instead of removing the entire process (e.g., all pages of the process), a process state may be preserved by removing some pages of the process. For example, since the execution speed of removing an SO page of a process is faster than the execution speed of removing the entire process, when loading again, the execution speed is relatively high, and thus, the process response speed may be improved.

After operation S840, operation S540 or operation S910 may be performed. In an embodiment, the swap space of the first memory may be secured by removing the first page from the first memory. Thereafter, the process that is running in the first memory or the page of the process may be swapped out to the swap space of the first memory.

Figure 9:
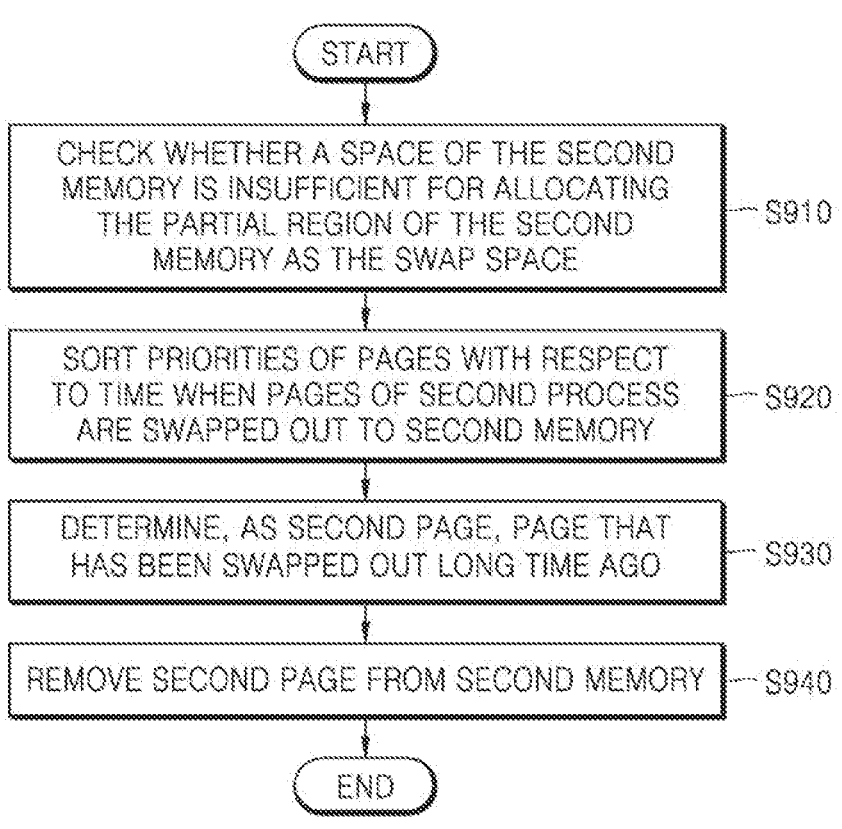
FIG. 9 is a detailed flowchart of a method of removing a page from a memory, according to an embodiment.

FIG. 9 is a detailed flowchart of a method of removing a page from a memory, according to an embodiment. FIG. 9 may be a detailed operation of operation S530 of FIG. 5 and may be performed after operation S840 of FIG. 8 is performed.

In operation S910, the electronic device 100 may check whether a swap space of a second memory is sufficient. In an embodiment, when allocating a partial region of the second memory as a swap space, the electronic device 100 checks whether a space for dynamically securing the swap space of the second memory (e.g., a volatile memory (RAM)) has reached a physical limit. In detail, the electronic device 100 checks whether, although it was attempted to additionally allocate the swap space of the second memory according to FIG. 5, but whether a space of the second memory has reached the physical limit and no more swap space can be secured.

In an embodiment, when an available capacity for allocating a new process to the first memory is insufficient even after removing the first page from the first memory according to FIG. 8, the electronic device 100 may check whether the swap space of the second memory is sufficient in order to swap-out a process running in the first memory or a page of the process to the second memory.

In operation S920, the electronic device 100 may sort priorities of pages with respect to a time when pages of a second process are swapped out to the second memory. For example, by calculating a period of time from when each page was swapped out, to a current point in time, the pages may be arranged in ascending order. Among swapped-out pages, pages that have not been swapped in for a long time are unlikely to be swapped in again, and thus may be subject to removal.

In operation S930, the electronic device 100 may determine, as the second page, a page that has been swapped out a long time ago, among pages stored in the swap space of the second memory. In an embodiment, the page that has been swapped-out a longest time ago when sorting in operation S920 may be determined as the second page. When the memory space is still insufficient even after that, an SO page with a swap-out the next longest time ago may be determined as the second page, and so on.

In operation S940, the electronic device 100 may remove the second page from the second memory. In an embodiment, the second page may include an SO page or a certain page. Instead of removing the entire process (e.g., all pages of the process), a process state may be preserved by removing some pages of the process. For example, since the execution speed of removing an SO page of a process is faster than the execution speed of removing the entire process, when loading again, the execution speed is relatively high, and thus, the process response speed may be improved.

After operation S940, operation S540 may be performed. In an embodiment, a swap space of the second memory may be secured by removing the second page from the second memory. Thereafter, the process that is running in the first memory or the page of the process may be swapped out to the swap space of the second memory.

Figure 10:
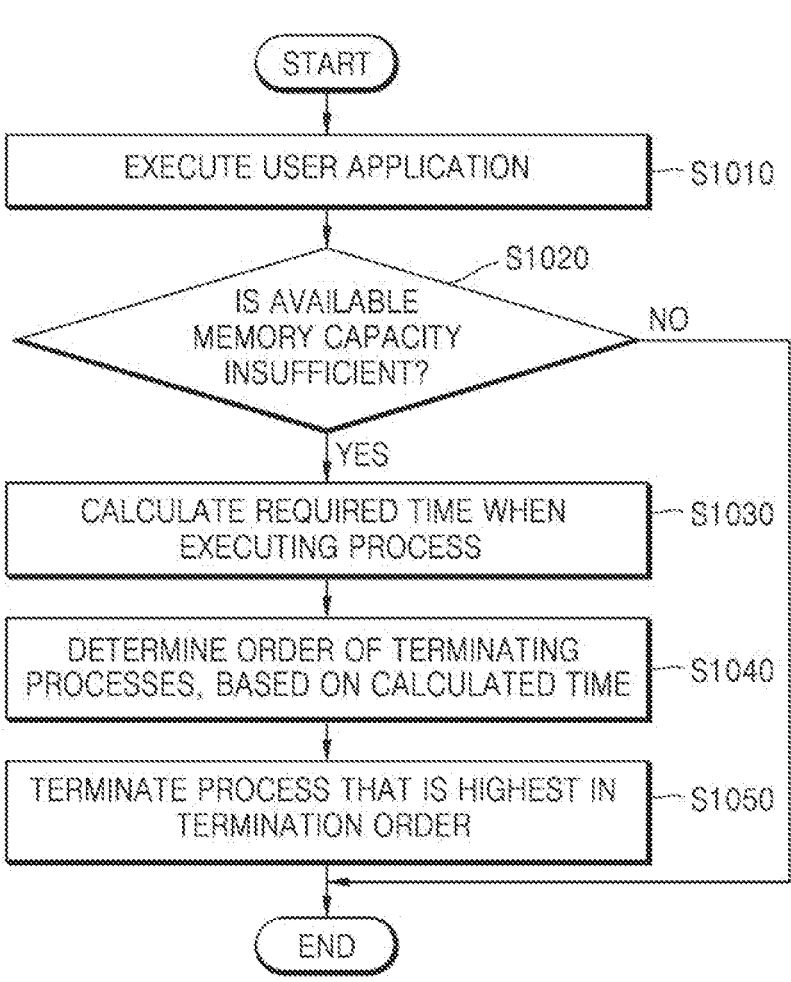
FIG. 10 is a flowchart of a method of terminating a process that is running, according to an embodiment.

FIG. 10 is a flowchart of a method of terminating a process that is running, according to an embodiment. FIG. 10 may be performed after operation S840 of FIG. 8 or after operation S940 of FIG. 9 is performed.

In operation S1010, the electronic device 100 may execute a user application.

In operation S1020, the electronic device 100 may determine whether available memory capacity is insufficient. In an embodiment, when an available capacity of a memory for allocating a new process is insufficient despite the dynamic allocation of the swap space and page removal of the process, the electronic device 100 may forcibly terminate at least one process running in the memory.

In operation S1030, the electronic device 100 may calculate a required time for an application to be driven. In an embodiment, the electronic device 100 may calculate a required time of an operation that takes a longest time when driving the application. For example, the electronic device 100 may calculate an SO symbol search time or an XML-UI conversion time.

In operation S1040, the electronic device 100 may determine an order of terminating processes, based on the calculated time. For example, the order of terminating processes may be determined in the order of a shortest time calculated for each process. In detail, when a particular process requires a relatively longer driving time, the termination order may be delayed so that the process is stored in the memory for as long as possible.

In operation S1050, the electronic device 100 may terminate a process that is highest in the termination order. In an embodiment, when the available memory capacity is still insufficient even after that, the electronic device 100 may terminate a process with a next higher priority, and so on.

Figure 11:
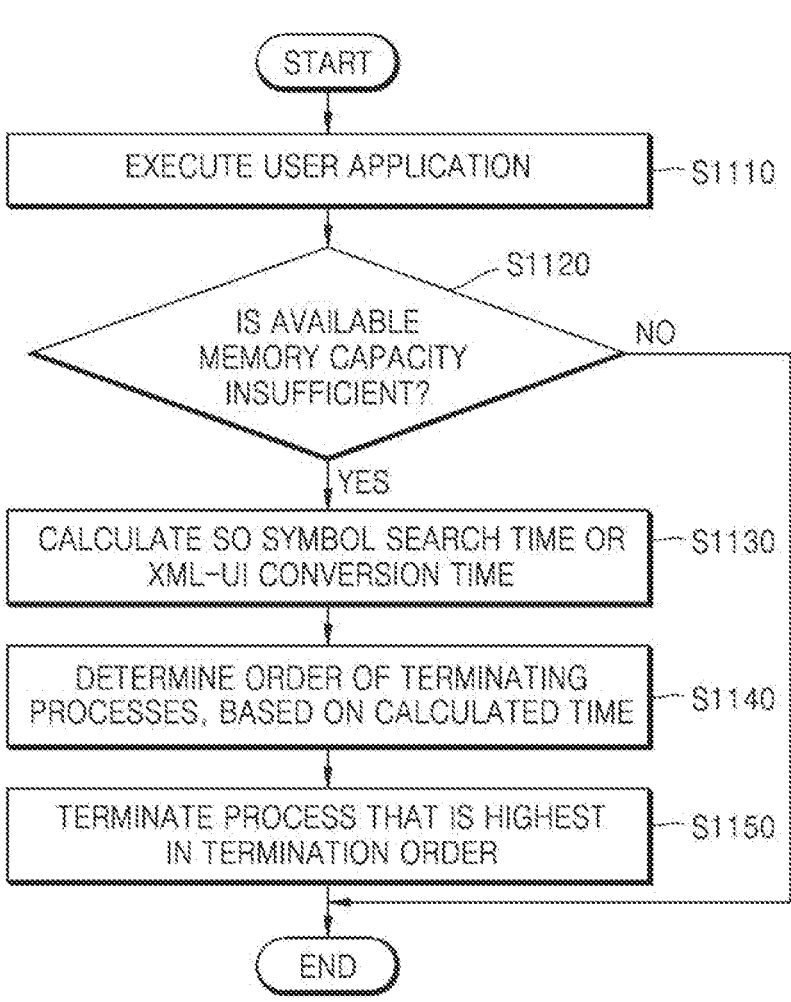
FIG. 11 is a detailed flowchart of a method of terminating a process that is running, according to an embodiment.

FIG. 11 is a detailed flowchart of a method of terminating a process that is running, according to an embodiment.

In operation S1110, the electronic device 100 may execute a user application.

In operation S1120, the electronic device 100 may determine whether available memory capacity is insufficient. In an embodiment, when available capacity of a memory for allocating a new process is insufficient despite the dynamic allocation of the swap space and page removal of the process, the electronic device 100 may forcibly terminate at least one process running in the memory.

In operation S1130, the electronic device 100 may calculate an SO symbol search time and/or an XML-UI conversion time.

In an embodiment, the electronic device 100 may calculate a time taken to search for an SO symbol required in the application, in a dynamic shared library. For example, a time taken to link source code of the application to the dynamic shared library during an application compilation time may be calculated. The required time may be measured by the Equation below:

$$Ts = \text{Lookup time for a symbol}$$

$$Tr = \text{Time to relocate a memory address of a symbol}$$

$$Tl = \text{Loading time of a } SO \text{ file}$$

$$T = \left( \sum_{for\ each\ symbol} (Ts + Tr) \right) + Tl$$

Ts denotes a symbol search time in the dynamic shared library, Tr denotes a time taken to reallocate a memory address of the required symbol, and Tl denotes a loading time of an SO file. T denotes a time required to search for an SO symbol required for each application.

In an embodiment, the electronic device 100 may calculate a time required to execute an XML-based UI process. In detail, the electronic device 100 may calculate a time taken to convert XML into UI. As an UI of applications becomes more complex, the XML processing cost increases, thus taking a long time to for XML-UI conversion when the application is running.

By calculating at least one of the SO symbol search time or XML-UI conversion time, an order of terminating processes that take a long time to drive may be determined, and thus, the user experience may be improved.

In operation S1140, the electronic device 100 may determine an order of terminating processes, based on the calculated time or based on the calculated times. For example, the process termination order may be determined in the order of a shortest time calculated for each process. In detail, when a particular process requires a relatively longer driving time, the termination order may be delayed so that the process is stored in the memory for as long as possible.

In operation S1150, the electronic device 100 may terminate a process that is highest in the termination order. In an embodiment, when the available memory capacity is still insufficient even after that, the process with a next higher priority may be terminated.

It is an embodiment to provide a technology that delays the operation of OOMK as much as possible and guarantees the responsiveness of applications.

The embodiment discloses a memory management device and method, in which a region of a volatile memory and region of a non-volatile memory are used as a swap region.

The embodiment discloses a memory management device and method for improving an Out-Of-Memory Killer (OOMK) operation to preserve a process state in an electronic device.

It is an aspect to provide an electronic device in which a memory is managed by securing available memory capacity to improve the responsiveness of an application, and an operating method thereof.

In an embodiment, an electronic device may include a first memory, a second memory. The electronic device may include a least one processor configured to execute a first process by loading, to the first memory, a page of pages of the first process related to an application stored in the second memory. The at least one processor may be further configured to check available capacity to allocate new process to first memory. The at least one processor may be further configured to determine whether to swap out the page of the first process to the first memory or the second memory, based on the available capacity, and characteristics of the first process that is running in the first memory. The at least one processor may be further configured to allocate, as a swap space, a partial region of the first memory or the second memory that is determined. The at least one processor may be further configured to swap-out the page of the first process from the first memory to the swap space. The at least one processor may be further configured to identify whether the swapped-out page is swapped-in from the swap space to the first memory. The at least one processor may be further configured to release the swap space.

In an embodiment, the characteristics of the first process may comprise at least one of a reaction time of the application or a degree of state preservation of a process.

In an embodiment, the at least one processor may be configured to, determine whether to swap out the page of the first process to the first memory or the second memory, based on the available capacity, the characteristics, and based on a number of times the page of the first process is referred to by a plurality of processes.

In an embodiment, the pages of the first process may comprise a shared object (SO) page belonging to a shared library.

In an embodiment, the at least one processor may be configured to, when a space of the first memory is insufficient for allocating the partial region of the first memory as the swap space, determine a first page among the pages of the first process, based on a number of times that the pages of the first process are referred to by a plurality of processes, and remove the first page from the first memory.

In an embodiment, the at least one processor may be configured to, when a space of the second memory is insufficient for allocating the partial region of the second memory as the swap space, determine a second page among pages written to the second memory, based on a time at which the pages written to the second memory were swapped out to the second memory, and remove the second page from the second memory.

In an embodiment, the at least one processor may be further configured to, when an available capacity for allocating a new process to the first memory is still insufficient even after removing the first page from the first memory, identify whether a space in the second memory is sufficient to swap-out a page of a process that is running in the first memory. In an embodiment, the at least one processor may be further configured to, when the space of the second memory is insufficient, determine a second page among pages written to the second memory, based on a time at which the pages written to the second memory were swapped out to the second memory. In an embodiment, the at least one processor may be further configured to remove the second page from the second memory.

In an embodiment, the first page and the second page may comprise a shared object (SO) page belonging to a shared library.

In an embodiment, the at least one processor may be further configured to, when the available capacity for allocating the new process to the first memory is still insufficient even after removing the second page from the second memory, calculate a required time for driving each process of a plurality of processes that are running in the first memory. In an embodiment, the at least one processor may be further configured to determine, based on the calculated times, an order of terminating the plurality of processes that are running in the first memory. In an embodiment, the at least one processor may be further configured to terminate at least one process from among the plurality of processes that are running in the first memory.

In an embodiment, the required time may comprise at least one of a time required for searching for an SO symbol of the page of the process or a time required for executing an extensible Markup Language (XML)-based User Interface (UI) process.

In an embodiment, a memory management method of an electronic device is provided. In an embodiment, the method may include checking available capacity to allocate new process to first memory. In an embodiment, the method may include determining whether to swap out the page of the first process to the first memory or the second memory, based on the available capacity and characteristics of the first process that is running in the first memory. In an embodiment, the method may include allocating, as a swap space, a partial region of the first memory or the second memory that is determined. In an embodiment, the method may include swapping out the page of the first process from the first memory to the swap space. In an embodiment, the method may include identifying whether the swapped-out page is swapped-in from the swap space to the first memory. In an embodiment, the method may include releasing the swap space.

In an embodiment, the characteristics of the first process may include at least one of a reaction time of the application or a degree of state preservation of a process.

In an embodiment, the determining of whether to swap out the page of the first process to the first memory or the second memory may include determining based on the available capacity, the characteristics and based on a number of times the page of the first process is referred to by a plurality of processes.

In an embodiment, the pages of the first process comprise a shared object (SO) page belonging to a shared library.

In an embodiment, the allocating may include when a space of the first memory is insufficient for allocating the partial region of the first memory as the swap space, determining a first page among the pages of the first process, based on a number of times that the pages of the first process are referred to by a plurality of processes. In an embodiment, the allocating may include removing the first page from the first memory.

In an embodiment, the allocating may include, when a space of the second memory is insufficient for allocating the partial region of the second memory as the swap space, determining a second page among pages written to the second memory, based on a time at which the pages written to the second memory are swapped out to the second memory. In an embodiment, the allocating may include removing the second page from the second memory.

In an embodiment, the method may include identifying, when an available capacity for allocating a new process to the first memory is still insufficient even after removing the first page from the first memory, whether a space in the second memory is sufficient to swap-out a page of a process that is running in the first memory. And, in an embodiment, the method may include determining, when the space of the second memory is insufficient, a second page among pages written to the second memory, based on a time at which the pages written to the second memory were swapped out to the second memory. In an embodiment, the method may include removing the second page from the second memory.

In an embodiment, the first page and the second page may comprise a shared object (SO) page belonging to a shared library In an embodiment, the method may include, when the available capacity for allocating the new process to the first memory is still insufficient even after removing the second page from the second memory, calculating a required time for driving each process of a plurality of processes that are running in the first memory. In an embodiment, the method may include determining an order of terminating the plurality of processes that are running in the first memory, based on the calculated times. In an embodiment, the method may include terminating at least one process from among the plurality of processes that are running in the first memory.

In an embodiment, the required time may include at least one of a time required for searching for an SO symbol of the page of the process or a time required for executing an extensible Markup Language (XML)-based User Interface (UI) process.

While one or more embodiments have been described with reference to the drawings, it will be understood by those of ordinary skill in the art that various changes in form and details may be made therein without departing from the spirit and scope as defined by the following claims.

What is claimed is:

1. An electronic device comprising:

a first memory;

a second memory; and at least one processor configured to execute a first process by loading, to the first memory, pages of the first process related to an application stored in the second memory, wherein the at least one processor is further configured to:

determine an available capacity of the first memory for executing a new process, determine whether to swap out the page of the first process to the first memory or the second memory, based on the available capacity, and based on characteristics of the first process that is running in the first memory, by:

when a space in the first memory is insufficient for allocating a region of the first memory as a swap space, determine a first page among the pages of the first process, based on a number of times that the pages of the first process are referred to by a plurality of processes, and remove the first page from the first memory, when the available capacity for allocating the new process to the first memory is still insufficient even after removing the first page from the first memory, identify whether a space in the second memory is sufficient to swap-out a page of a process that is running in the first memory, and when the space in the second memory is insufficient, determine a second page among pages written to the second memory, based on a time at which the pages written to the second memory were swapped out to the second memory, and remove the second page from the second memory, allocate a partial region of the first memory or the second memory that is determined as a new swap space, swap-out the page of the first process from the first memory to the new swap space, identify whether the swapped-out page is swapped-in from the new swap space to the first memory, and release the new swap space based on the new swap space being empty by the identifying that the swapped-out page is swapped-in.

2. The electronic device of claim 1, wherein the characteristics of the first process comprise at least one of a reaction time of the application or a degree of state preservation of a process.

3. The electronic device of claim 2, wherein the at least one processor is configured to determine the number of times the page of the first process is referred to by the plurality of processes.

4. The electronic device of claim 1, wherein the pages of the first process comprise a shared object (SO) page belonging to a shared library.

5. The electronic device of claim 1, wherein the first page and the second page comprise a shared object (SO) page belonging to a shared library.

6. The electronic device of claim 1, wherein the at least one processor is further configured to, when the available capacity for allocating the new process to the first memory is still insufficient even after removing the second page from the second memory, calculate a required time for driving each process of a plurality of processes that are running in the first memory, determine, based on the calculated times, an order of terminating the plurality of processes that are running in the first memory, and terminate at least one process from among the plurality of processes that are running in the first memory.

7. The electronic device of claim 6, wherein the required time comprises at least one of a time required for searching for an SO symbol of the page of the process or a time required for executing an extensible Markup Language (XML)-based User Interface (UI) process.

8. A memory management method of an electronic device, the memory management method comprising:

determining an available capacity of a first memory for executing a new process, determining whether to swap out a page of a first process to the first memory or to a second memory, based on the available capacity, and based on characteristics of the first process that is running in the first memory, by:

when a space in the first memory is insufficient for allocating a region of the first memory as a swap space, determining a first page among pages of the first process, based on a number of times that the pages of the first process are referred to by a plurality of processes, and removing the first page from the first memory, when the available capacity for allocating the new process to the first memory is still insufficient even after removing the first page from the first memory, identifying whether a space in the second memory is sufficient to swap-out a page of a process that is running in the first memory, when the space in the second memory is insufficient, determining a second page among pages written to the second memory, based on a time at which the pages written to the second memory were swapped out to the second memory, and removing the second page from the second memory, allocating a partial region of the first memory or the second memory that is determined as a new swap space, swapping out the page of the first process from the first memory to the new swap space, identifying whether the swapped-out page is swapped-in from the new swap space to the first memory, and releasing the new swap space based on the new swap space being empty by the identifying that the swapped-out page is swapped-in.

9. The memory management method of claim 8, wherein the characteristics of the first process comprise at least one of a reaction time of an application or a degree of state preservation of a process.

10. The memory management method of claim 9, further comprising determining the number of times the page of the first process is referred to by the plurality of processes.

11. The memory management method of claim 8, wherein the pages of the first process comprise a shared object (SO) page belonging to a shared library.

12. The memory management method of claim 8, wherein the first page and the second page comprise a shared object (SO) page belonging to a shared library.

13. The memory management method of claim 8, further comprising:

when the available capacity for allocating the new process to the first memory is still insufficient even after removing the second page from the second memory, calculating a required time for driving each process of a plurality of processes that are running in the first memory;

determining an order of terminating the plurality of processes that are running in the first memory, based on the calculated times; and terminating at least one process from among the plurality of processes that are running in the first memory.

14. The memory management method of claim 13, wherein the required time comprises at least one of a time required for searching for an SO symbol of the page of the process or a time required for executing an extensible Markup Language (XML)-based User Interface (UI) process.

\* \* \* \* \*